J. M. BROWN.
ELECTRICAL SYSTEM.
APPLICATION FILED DEC. 2, 1916.
1,343,345.
Patented June 15, 1920.
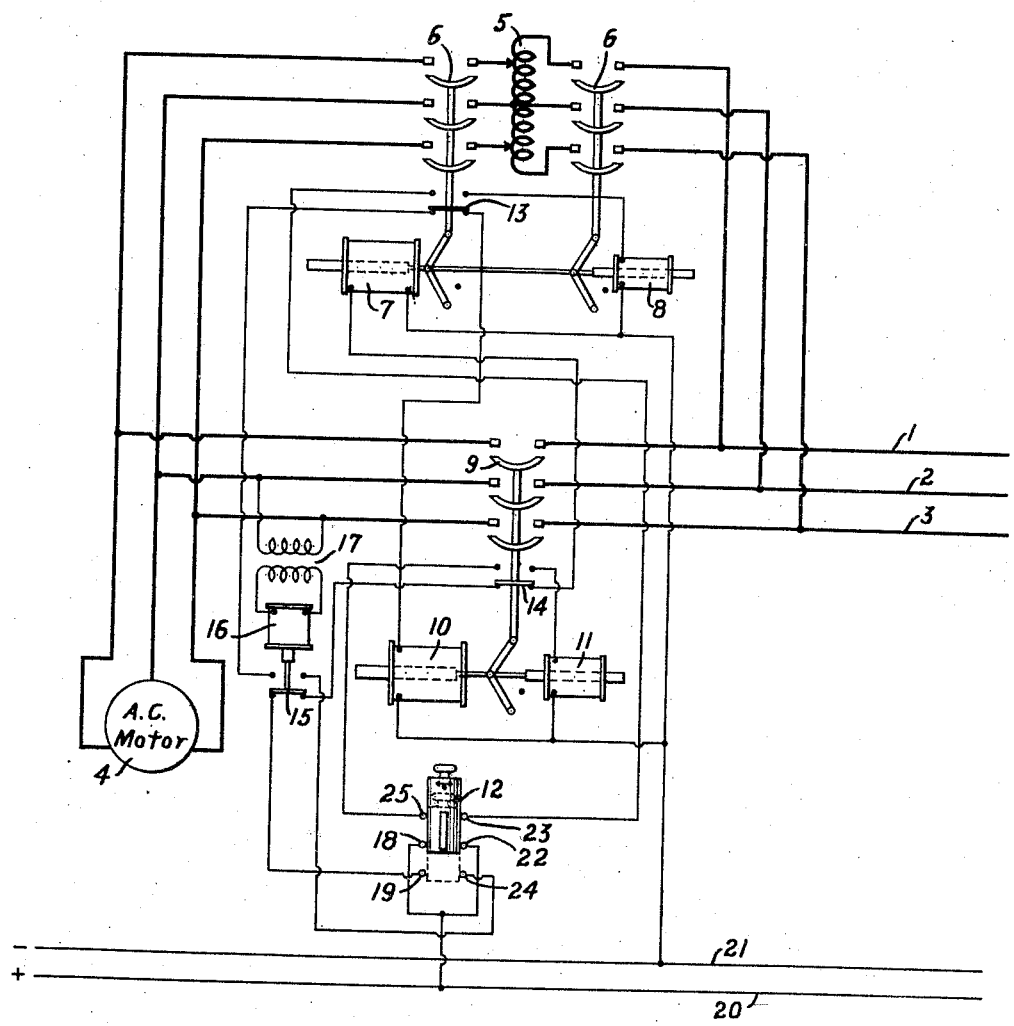
WITNESSES:
Fred. A. Lind.
J. R. Langley
INVENTOR
James M. Brown
BY
Wesley G. Carr
ATTORNEY

UNITED STATES PATENT OFFICE.

JAMES M. BROWN, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL SYSTEM.

1,343,345.  Specification of Letters Patent.  Patented June 15, 1920.

Application filed December 2, 1916. Serial No. 134,606.

*To all whom it may concern:*

Be it known that I, JAMES M. BROWN, a citizen of the United States, and a resident of Pittsburgh, in the county of Allegheny and State of Pennsylvania, have invented a new and useful Improvement in Electrical Systems, of which the following is a specification.

My invention relates to electrical systems and particularly to such systems as embody means for reducing the voltage applied to electric motors when they are initially connected to sources of current and means for subsequently connecting the motors directly to the sources of current.

My invention has for its object to provide a system of the character indicated above which is so arranged that the starting and running circuits of the motor are completed in the proper sequence and the establishing of the running connections of the motor is prevented except under predetermined conditions.

In the operation of electric motors under such conditions as require the application of a reduced voltage in starting, it may occur that the starting connections are opened and the running connections are established before the motor has been sufficiently accelerated and its counter-electromotive force has reached such value that an excessive rush of current is prevented when the running connections are established. The motor may be damaged by the premature change in connections under the conditions above described. In case a single controlling device is employed for effecting the closing and opening of the several switches for controlling the starting and running circuits, it may occur, also, that the switches are operated in an improper sequence.

I provide an arrangement whereby the starting switch and the running switch are so interlocked that they cannot be closed simultaneously. An electro-responsive device, that is controlled in accordance with the counter-electromotive force of the motor, prevents the operation of the starting switch except when the counter-electromotive force of the motor is below a predetermined value and prevents the operation of the running switch except when the counter-electromotive force of the motor is above a predetermined value. A single manually operable controlling device controls the circuits of the closing coils and tripping coils with which the main switches are provided.

In the accompanying drawing, the single figure is a diagrammatic view of circuits and apparatus embodying my invention.

Line conductors 1, 2 and 3, which may be connected to any suitable source of alternating current, supply energy to an electric motor indicated at 4 and which may be of any suitable type, as, for example, an induction motor or a synchronous motor. A starting circuit for the motor comprises an auto transformer 5 and a pair of triple-pole switches 6 which respectively control the connections of the primary and secondary terminals of the transformer.

The switches 6 are controlled by a single operating mechanism comprising a closing coil 7 and a tripping coil 8. A switch 9, which connects the motor directly to the line conductors 1, 2 and 3, is provided with a closing coil 10 and a tripping coil 11.

The circuits of the several coils are controlled by a manually operable switch 12 which may be reciprocated longitudinally and rotated in either direction to effect the closing of a circuit for a single coil. One of the switches 6 and the switch 9 are respectively provided with auxiliary switches or interlocks 13 and 14, each of which is in circuit with the closing coil of the other switch and in circuit with the tripping coil of the same switch.

The circuits of the closing coils of the respective switches are controlled by a relay 15 having an actuating coil 16 that is connected between two terminals of the primary winding of the motor through a transformer 17. The relay 15 is accordingly responsive to the counter-electromotive force of the motor when the main switches are open.

In the operation of the system above described, the movable member of the switch 12 is actuated to the position indicated by dotted lines and rotated to cause it to bridge contact members 18 and 19. A circuit is completed which extends from a positive line conductor 20, which may be connected to a suitable source of direct current, through contact members 18 and 19, relay 15, interlock 14, and closing coil 7 of switches 6, to the negative conductor 21.

The switches 6 are then closed and the primary windings of the motor are connected to line conductors 1, 2 and 3 through the auto transformer 5. When the motor speed is such that its counter-electromotive force has a safe value at which the motor may be directly connected to the line conductors and full voltage applied to its primary windings, the switch 12 is actuated to such position as to bridge contact members 22 and 23. A circuit, which is thereby completed, extends from conductor 20, through contact members 22 and 23, interlock 13, which is in its upper position, and tripping coil 8 to conductor 21. The switches 6 then open to disconnect the auto transformer 5 from the motor and from the line conductors.

The motor is now disconnected from the line conductors 1, 2 and 3, and the coil 16 of relay 15 is energized in accordance with the counter-electromotive force of the motor. If the coil 16 is sufficiently energized to actuate the relay 15 to its upper position, the switch 12 may complete a circuit which extends from line conductor 20 through contact members 24 and 22, relay 15, interlock 13, which is in its lower position, and closing coil 10 of switch 9 to conductor 21.

The switch 9 then closes to connect the motors directly to the line conductors 1, 2 and 3, and normal running conditions of the motor are established. To stop the motor, it is only necessary to actuate the switch 12 to bridge contact members 18 and 25 to complete the circuit for a tripping coil 11 of switch 9. This circuit comprises the interlock 14 which is in its upper position.

It will be noted that, when either of the switches 6 and 9 is closed, the corresponding interlock 13 or 14, as the case may be, opens the circuit of the closing coil of the other switch and partially completes the circuit of the tripping coil of the corresponding switch. This arrangement insures that the switches 6 and 9 cannot be closed simultaneously. The simultaneous operation of the switches is further prevented by so arranging the switch 12 that a single circuit may be completed by it at any time.

The relay 15, which is energized in accordance with the counter-electromotive force of the motor when the main switches are opened and in accordance with the applied voltage when either of the switches is closed, renders the starting switch inoperative in case the potential between the terminals of the motor exceeds a predetermined value. The relay 15 effectually prevents, also, the closing of the running switch before the motor has reached a predetermined safe speed at which its counter-electromotive force has a predetermined value.

I claim as my invention:

1. The combination with an electric motor and a starting circuit and a running circuit therefor, of a two-position switch controlled in accordance with the speed of said motor for controlling said starting circuit in one of its positions and said running circuit in its other position.

2. In an electrical system, the combination with an electric motor having a primary winding, a starting circuit therefor and a running circuit for connecting said winding directly to a source of current, of switching devices for controlling said circuits and means for insuring the operation of said devices in a predetermined sequence, said means comprising an electro-responsive device in circuit with said winding.

3. In an electrical system, the combination with an electric motor having a primary winding, a starting circuit therefor, and a running circuit for connecting said winding directly to a source of current, of switching devices for controlling said circuits and means for insuring the operation of said devices in a predetermined sequence, said means comprising auxiliary switches controlled by said switching devices, and an electro-responsive device in circuit with said winding.

4. In an electrical system, the combination with an electric motor having a primary winding, a starting circuit therefor and a running circuit for connecting said winding directly to a source of current, of switching devices for controlling said circuits and means for insuring the operation of said devices in a predetermined sequence, said means comprising an electro-responsive device in circuit with said winding and having two operative positions for selectively rendering the one or the other of said switching devices operative.

5. In an electrical system, the combination with an electric motor, and a starting switch and a running switch therefor, of means for preventing the operation of said starting switch except when said running switch is open and the counter-electromotive force of said motor is below a predetermined value.

6. In an electrical system, the combination with an electric motor, and a starting switch and a running switch therefor, of means for preventing the operation of said running switch except when said starting switch is open and the counter-electromotive force of said motor exceeds a predetermined value.

7. In an electrical system, the combination with an electric motor and switches for respectively establishing starting and running circuits for said motor, of electromagnetic means for actuating said switches, auxiliary switches operatively connected to the other switches, and an electro-responsive device in circuit with the motor for controlling the circuits of said electromagnetic means.

8. In an electrical system, the combination with an electric motor and a pair of main switches therefor, of an auxiliary switch connected to each of said main switches, a fifth switch adapted to occupy two positions in accordance with the electrical conditions of said motor, means for establishing a circuit through said fifth switch when it occupies one of said two positions and through the auxiliary switch connected to one of said main switches for causing the closing of said other main switch and means for establishing a circuit through said fifth switch when it occupies the other of said two positions and through the auxiliary switch connected to said other main switch to cause the closing of said one main switch.

9. In an electrical system, the combination with an electric motor, and main switches for respectively establishing starting and running connections therefor, of closing and tripping coils for said switches, an auxiliary switch operatively connected to each of said main switches and operable upon the closing of the corresponding main switch to render the tripping coil of the latter switch operative and to render the closing coil of the other main switch inoperative, and a relay for controlling the circuits of said closing coils in accordance with the counter-electromotive force of said motor.

10. In an electrical system, the combination with an alternating-current motor, a transformer, and switching devices for connecting said motor to a source of current either through said transformer or directly, of electro-responsive means for controlling said devices, and means comprising an electro-responsive device in circuit with said motor and auxiliary switches controlled by said devices for insuring the establishing of the motor connections in a definite sequence.

11. In an electrical system, the combination with an electric motor, and main switches for respectively establishing starting and running connections therefor, of closing and tripping coils for said switches, an auxiliary switch operatively connected to each of said main switches and operable, upon the closing of the corresponding main switch, to render the tripping coil of the latter switch operative and to render the closing coil of the other main switch inoperative, and a manually operable controlling device having a single switch member for selectively controlling the circuits of said coils.

12. The combination with an electric motor, a starting circuit and a running circuit therefor, and a source of energy for said motor, of means for controlling said motor controlled in accordance with the electrical conditions of said motor when one of said circuits is open and in accordance with the electrical conditions of said source when one of said circuits is closed.

In testimony whereof I have hereunto subscribed my name this 25th day of Nov. 1916.

JAMES M. BROWN.